Patented Mar. 13, 1951

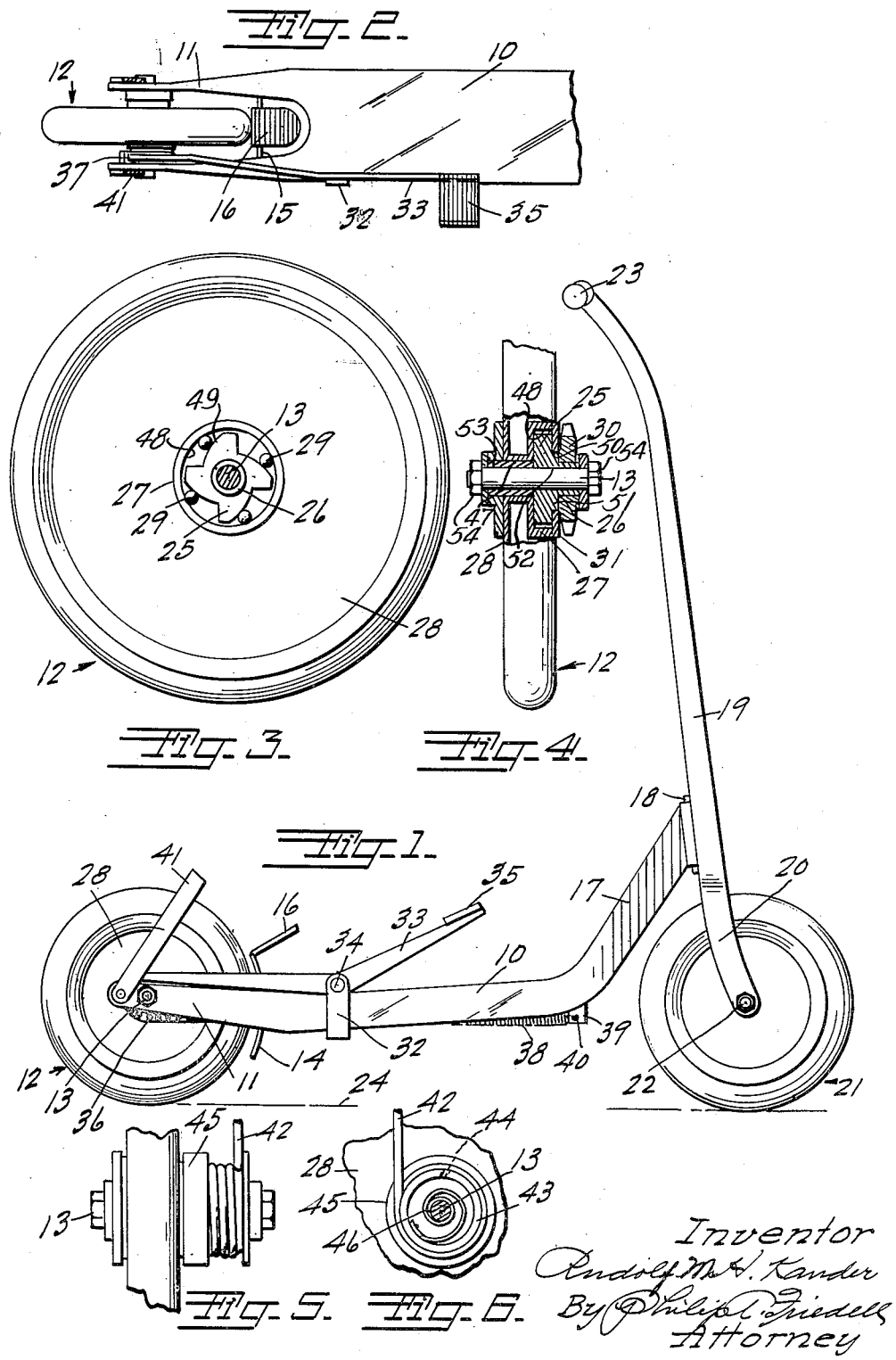

2,544,996

UNITED STATES PATENT OFFICE 2,544,996

REAR WHEEL DRIVE FOR SCOOTERS AND THE LIKE

Rudolf M. H. Kander, Kansas City, Mo.

Application July 7, 1947, Serial No. 759,315

1 Claim. (Cl. 280—251)

This invention relates to improvements in scooters, the type of wheeled vehicle which children propel through force applied with one foot on the surface on which the scooter travels and with the other foot and body weight normally supported on the low platform of the vehicle, and provides for foot-power propulsion applied through a treadle to forcibly drive the rear wheel of the vehicle, thus saving the wear on the propelling shoe, making the scooter easier to handle and safer to use, and providing for increased speeds through treadle propulsion while still permitting conventional propulsion when desired.

The objects and advantages of the invention are as follows:

First, to provide a scooter with treadle driving means.

Second, to provide a scooter with an over-running or free-wheeling clutch and treadle-operated drive.

Third, to provide a scooter with a treadle-operable drive which will not interfere with normal operation of the scooter when such normal operation is desired.

Fourth, to provide a scooter with a treadle-operable drive which can be operated as desired without regard to the speed of the vehicle.

Fifth, to provide an attachment for converting a conventional scooter into a treadle-operable vehicle.

Sixth, to provide a treadle-operable power attachment for scooters, and which is simple in construction and easy to operate.

In describing the invention reference will be made to the accompanying drawings, in which:

Fig. 1 is a side elevation of a scooter with my invention applied thereto.

Fig. 2 is a fragmentary top plan view of Fig. 1.

Fig. 3 is an enlarged side elevation of the new rear wheel incorporating the over-running or free-wheeling clutch.

Fig. 4 is a sectional elevation through the drive and clutch portion of the rear wheel.

Fig. 5 shows a modification of the drive and drawn to an enlarged scale.

Fig. 6 is a side elevation of Fig. 5 with the cover plate for the spring drum removed.

The conventional scooter consists of a frame including a platform 10 terminating at the rear end in a yoke 11 to span the rear wheel 12 which is supported therein by the axle 13; a brake 14 which is pivoted in the yoke forward of the wheel as indicated at 15 and having a foot-operable pedal 16 for operation of the brake by the heel of the operator, at will, the forward end of the frame terminating in an upwardly inclined portion 17 terminating in a swivel connection 18 with the steering column 19 which in turn terminates at its lower end in a yoke 20 spanning and supporting the front wheel 21 by means of the axle 22, and terminating at the upper end in handle bars 23.

This conventional scooter is operated with one foot supported on the platform 10 while the other foot is used to propel the scooter by contacting the surface 24 and applying a rearward pressure alongside the platform. This causes considerable wear on the propelling shoe and requires a great deal of effort while simultaneously making the scooter somewhat difficult to steer and control, and limits the speed to approximately that of the running speed of the operator.

My invention eliminates the wear on the driving shoe, makes the scooter easy to handle and steer, and permits speeds in excess of the running speed of the operator, and consists in providing the rear wheel 12 with a one-way or free-wheeling clutch which consists of a cam member 25 having a first axial hub 51 and a hub extension 26 and provided with an axial bore 52 for rotation on the axle 13, and with the cam member operating in a clutch chamber in the axial hub 27 which is integral with the wheel disc 28. This axial hub has an axial bore 47 formed in one end and continuing to a coaxial counterbore formed in the other end forming the clutch chamber.

Releasable gripping members consisting of rollers or balls 29 cooperate between the cam surfaces 49 and the inner periphery of the counterbore or clutch chamber 48 when the cam member is rotated in one direction, and are free to allow free rotation of the wheel when the cam member is idle or rotated in the opposite direction; the relative rotation of the wheel ahead of the cam member causing the balls to back up out of engagement.

Mounted on the hub extension 26 is a sprocket 30 which is forced, keyed, or otherwise secured on the hub extension 26.

A cover plate 31 has an axial bore 50 rotatably fitting the axial hub 51 on the clutch cam and retains the clutch against relative axial movement within the clutch chamber, and is suitably secured to the housing; this cover plate being thinner than the space between the clutch cam and the sprocket as defined by the hub 51.

A sleeve 53 is rotatable in the axial bore 47 and extends from the clutch cam to a point beyond the outer end of the axial hub 27 to form a bearing rotatable on the axle 13, and nuts 54 are provided for securing the axle 13 to the respective legs of the yoke 11.

Detachably mounted on the platform 10 is a bracket 32 to which is intermediately pivoted a treadle 33 as indicated at 34 and having a treadle pad 35 at the forward end and having one end of a driving chain 36 fastened to the other end 37, the other end of the driving chain being secured to one end of a tension spring 38 with the other end secured to a bracket 39 on the forward end of the frame as indicated at 40, the chain and spring being tensioned beneath the platform.

The stand 41 for supporting the scooter in an upright position when not in use, is conventional equipment with the standard scooter and does not interfere with the invention in any way.

In operation the weight of the operator is supported by one foot on the platform 10 while the other foot is placed on the treadle pad 35. Each time the treadle pad is depressed, the rearward end of the treadle is raised and draws up on the chain which rotates the rear wheel forward, the treadle and chain being operated against the tension of the spring 38. When the treadle is released, the forward movement of the wheel causes the balls to release between the cam surfaces and the housing so as not to hinder the forward movement or speed of the vehicle, and the spring 38 draws the sprocket back to its normal position ready for another stroke, while simultaneously returning the treadle to its normal position shown.

Thus the scooter can be used in the conventional manner or it can be operated by the foot treadle, either rapidly or slowly, regularly or only occasionally, in fact operation can be controlled at will.

The modification in Figs. 5 and 6 shows the operating means as any type of flexible element such as chain, cable, or cord, as indicated at 42 one end of which is attached to the rear end 37 of the treadle and the other end to the drum 43 as indicated at 44 the clutch housing 45 being illustrated as mounted on the outside of the wheel disc 28, and this drum 43 is retracted by a coil spring 46 within the housing and being of the conventional clock spring type.

It will be noted that the type of spring and spring barrel shown in Figs. 5 and 6 can be used with the chain drive by fastening the other end of the chain to the sprocket instead of to the spring 38, with the sprocket teeth formed on the spring drum, and that the type of retracting spring 38 can be used with the cable or cord type, by fastening the other end of the cable or cord to the end of the spring 38 and intermediately securing the cable or cord to the drum. Such variations are readily apparent.

I claim:

A rear drive wheel for a scooter or the like having a rear yoke, comprising; an axial hub integral within said drive wheel and having a first axial bore at one end and terminating in a counterbore at the other end to form a clutch chamber, and a cover plate for said clutch chamber and provided with a second axial bore; a clutch cam having a first axial hub rotatable in said second axial bore and continuing with a hub extension of lesser diameter having a sprocket fixedly mounted thereon, and with said cover plate rotatable between said sprocket and said clutch cam for retention against relative axial movement; said clutch cam and its first axial hub and hub extension having a third axial bore formed therethrough; a sleeve rotatable in said first bore and extending from said clutch cam to a point beyond said one end to form a bearing, and an axle including a nut for each end for securing to the respective legs of the yoke; said clutch cam being freely rotatable on said axle, and releasable gripping members cooperative between said clutch cam and the inner periphery of said clutch chamber.

RUDOLF M. H. KANDER.

REFERENCES CITED

The following references are of record in the file of this patent:

UNITED STATES PATENTS

| Number | Name | Date |
|---|---|---|
| 1,033,049 | Chase et al. | July 16, 1912 |
| 1,237,969 | Stocks | Aug. 21, 1917 |
| 1,587,650 | Johnson | June 8, 1926 |
| 1,621,350 | Burke | Mar. 15, 1927 |
| 2,053,835 | Kimball et al. | Sept. 8, 1936 |
| 2,310,152 | Ronning | Feb. 2, 1943 |